US008681995B2

(12) United States Patent
Seshadri et al.

(10) Patent No.: US 8,681,995 B2
(45) Date of Patent: Mar. 25, 2014

(54) SUPPORTING DNS SECURITY IN A MULTI-MASTER ENVIRONMENT

(75) Inventors: Shyam Seshadri, Redmond, WA (US); Jeffrey J. Westhead, Duvall, WA (US); Vamshi Krishna Kancharla, Redmond, WA (US); Daniel R. Simon, Redmond, WA (US); Anthony G. Jones, Kirkland, WA (US); Frank Ronneburg, Sammamish, WA (US); Guillaume V. Bailey, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 494 days.

(21) Appl. No.: 12/974,590

(22) Filed: Dec. 21, 2010

(65) Prior Publication Data

US 2012/0155646 A1 Jun. 21, 2012

(51) Int. Cl.
 *H04L 29/06* (2006.01)
(52) U.S. Cl.
 USPC ............. 380/279; 380/44; 713/168; 713/172; 713/176
(58) Field of Classification Search
 USPC .......... 713/168, 172, 176; 380/278, 279, 280, 380/285; 59/168, 172, 176
 See application file for complete search history.

(56) References Cited

U.S. PATENT DOCUMENTS

| 6,381,627 B1* | 4/2002 | Kwan et al. ................... 709/201 |
| 8,538,028 B2* | 9/2013 | Yeap et al. .................... 380/278 |
| 2002/0143989 A1* | 10/2002 | Huitema et al. .............. 709/243 |
| 2009/0187649 A1 | 7/2009 | Migault et al. |
| 2010/0161774 A1* | 6/2010 | Huang et al. .................. 709/221 |
| 2012/0117621 A1* | 5/2012 | Kondamuru et al. ............. 726/3 |

OTHER PUBLICATIONS

Granzer, et al., "Key Set Management in Networked Building Automation Systems using Multiple Key Servers", Retrieved at << http://www.auto.tuwien.ac.at/~wgranzer/keyserver_wfcs2008.pdf >>,2008, pp. 10.
Hardjono, et al., "An Approach to Key Management and Inter-Domain Authentication in the Telecommunications Management Network", Retrieved at << http://ieeexplore.ieee.org/stamp/stamp.jsp?tp=&arnumber=318118&userType=inst >>, 1993, pp. 171-176.
"DNSSEC Deployment Planning", Retrieved at << http://technet.microsoft.com/en-us/library/ee649173(WS.10).aspx >>,, Oct. 7, 2009, pp. 5.
"Understanding DNSSEC in Windows", Retrieved at << http://technet.microsoft.com/en-us/library/ee649277(WS.10).aspx >>,Oct. 7, 2009, pp. 4.
"Zonesigner", Retrieved at << http://www.dnssec-tools.org/docs/tool-description/zonesigner.html >>, Retrieved Date: Oct. 18, 2010, pp. 14.

(Continued)

*Primary Examiner* — Brandon Hoffman
*Assistant Examiner* — Thomas C Lauzon
(74) *Attorney, Agent, or Firm* — Andrew Sanders; Micky Minhas; Wolfe-SBMC

(57) ABSTRACT

Multiple peer domain name system (DNS) servers are included in a multi-master DNS environment. One of the multiple peer DNS servers is a key master peer DNS server that generates one or more keys for a DNS zone serviced by the multiple peer DNS servers. The key master peer DNS server can also generate a signing key descriptor that identifies the set of one or more keys for the DNS zone, and communicate the signing key descriptor to the other ones of the multiple peer DNS servers.

20 Claims, 5 Drawing Sheets

(56) References Cited

OTHER PUBLICATIONS

"Using OpenDNSSEC v1.1.0", Retrieved at << http://www.opendnssec.org/documentation/using-opendnssec/v1-1-0/ >>, Retrieved Date: Oct. 18, 2010, pp. 15.

Mockapetris, P. "Domain Names—Concepts and Facilities", *RFC 1034*, Available at <http://www.ietf.org/rfc/rfc1034.txt>,(Nov. 1987),pp. 1-55.

Mockapetris, P. "Domain Names—Implementation and Specification", *RFC 1035*, Available at <http://www.faqs.org/rfcs/rfc1035.html>,(Nov. 1987),pp. 1-55.

Arends, R. "DNS Security Introduction and Requirements", *RFC 4033*, Available at <http://www.ietf.org/rfc/rfc4033.txt>,(Mar. 2005),pp. 1-21.

Arends, R. "Resource Records for the DNS Security Extensions", *RFC 4034*, Available at <http://www.ietf.org/rfc/rfc4034.txt>,(Mar. 2005),pp. 1-29.

Arends, R. "Protocol Modifications for the DNS Security Extensions", *RFC 4035*, Available at <http://www.ietf.org/rfc/rfc4035.txt>,(Mar. 2005),pp. 1-53.

Laurie, B. et al., "DNS Security (DNSSEC) Hashed Authenticated Denial of Existence", *RFC5155*, Available at <http://tools.ietf.org/search/rfc5155>,(Mar. 2008),pp. 1-52.

\* cited by examiner

SUPPORTING DNS SECURITY IN A MULTI-MASTER ENVIRONMENT

BACKGROUND

A typical domain name system (DNS) server resolves names to Internet Protocol (IP) addresses. The DNS Security Extensions (DNSSEC) protocol has been developed to add security extensions to the DNS system. However, typical DNS systems are established to have a primary DNS server and one or more secondary DNS servers. It can be problematic to implement the DNSSEC protocol in environments that have more than one primary DNS server.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a signing key descriptor that identifies how a domain name system (DNS) zone is to be signed is generated. Additionally, a set of one or more keys for the DNS zone is generated, based at least in part on the signing key descriptor, at a first peer DNS server of a multi-master DNS environment. The signing key descriptor is also provided to one or more additional peer DNS servers of the multi-master DNS environment.

In accordance with one or more aspects, at a first peer DNS server a signing key descriptor from a second peer DNS server is received. Both the first peer DNS server and the second peer DNS server are DNS servers for a DNS zone of a multi-master DNS environment. One or more keys are obtained from a key store, and the one or more keys are used to generate, based at least in part on the signing key descriptor, digital signatures for DNS data for the DNS zone.

BRIEF DESCRIPTION OF THE DRAWINGS

The same numbers are used throughout the drawings to reference like features.

DETAILED DESCRIPTION

Figure 1:
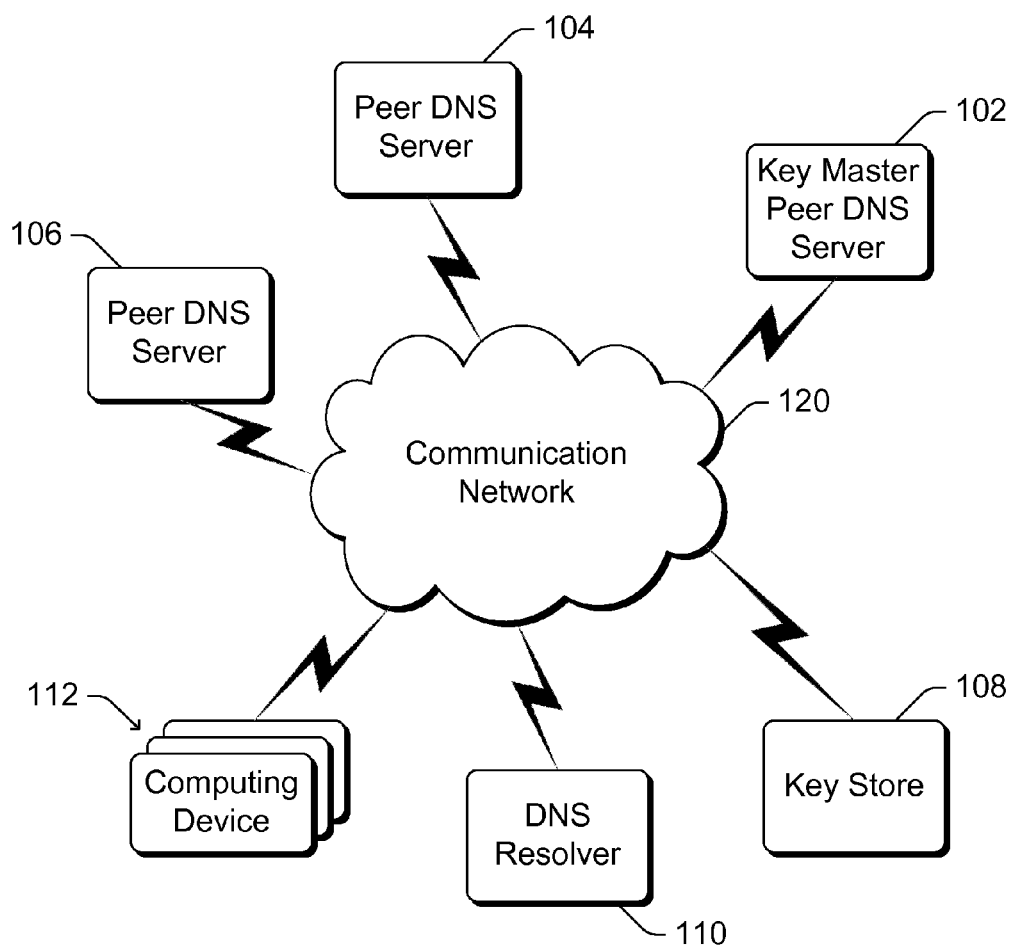
FIG. 1 illustrates an example network implementing the supporting DNS security in a multi-master environment in accordance with one or more embodiments.

Supporting domain name system (DNS) security in a multi-master environment is discussed herein. A multi-master environment implementing DNS security extensions includes multiple DNS servers that operate as peers with respect to hosting a particular zone. One of the multiple peer DNS servers is a key master server, and is responsible for generating keys and managing the lifecycle of keys, as well as distributing the keys to the other peer DNS servers. Each of the multiple peer DNS servers is responsible for generating its own digital signatures, using the same one or more shared keys, for DNS data that is returned in response to DNS requests submitted to the DNS server.

References are made herein to digital signatures and digital certificates. Although digital signatures and digital certificates are well-known to those skilled in the art, a brief overview of such is included here to assist the reader. Digital signatures and digital certificates are typically generated using public key cryptography. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. However, any entity with the public key can use the public key to verify the digital signature by executing a suitable digital signature verification algorithm on the public key, the signature, and the data that was signed. A digital certificate can be created that includes an identifier of an entity and the public key for that entity, and the digital certificate digitally signed using the private key of that entity in order to bind the identifier of the entity to the public key for that entity.

Digital signatures and digital certificates can alternatively be generated using symmetric key cryptography. In symmetric key cryptography a shared key (also referred to as a symmetric key) is known by and kept secret by the two entities. Any entity having the shared key is typically able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key. Similarly, an entity with a shared key can encrypt data that can be decrypted by that same entity, but other entities cannot decrypt the data if the other entities do not know the shared key. Additionally, digital signatures can be generated based on symmetric key cryptography, such as using a keyed-hash message authentication code mechanism. Any entity with the shared key can generate and verify the digital signature. For example, a trusted third party can generate a symmetric key based on an identity of a particular entity, and then can both generate and verify digital signatures for that particular entity (e.g., by encrypting or decrypting the data using the symmetric key). A digital certificate can be created that includes an identifier of the entity and the public key for that entity, and the digital certificate digitally signed (e.g., by the trusted third party) in order to bind the identifier of the entity to the public key for that entity.

FIG. 1 illustrates an example system 100 implementing the supporting DNS security in a multi-master environment in accordance with one or more embodiments. System 100 includes a communication network 120 that allows various ones of the devices in system 100 to communicate with various other devices in system 100. Communication network 120 can include wired and/or wireless communications, and can be, for example, a local area network (LAN), the Internet, a public telephone network, a private telephone network, other public and/or proprietary networks, combinations thereof, and so forth. Communication network 120 can include various network communication devices, such as routers, gateways, firewalls, and so forth.

System 100 includes multiple peer DNS servers 102, 104, and 106, a key store 108, a DNS resolver 110, and one or more computing devices 112. Computing devices 112 can be a variety of different types of devices, such as a desktop computer, a server computer, a laptop or netbook computer, a tablet or notepad computer, a mobile station, a database or other storage device, an entertainment appliance, a set-top box communicatively coupled to a display device, a television or other display device, a cellular or other wireless phone, a game console, an automotive computer, and so forth.

Peer DNS servers 102, 104, and 106 resolves names to network addresses. Peer DNS servers 102, 104, and 106 each operate to resolve a particular set of names, referred to as a DNS zone (or just a zone). The one or more DNS zones for which peer DNS servers 102, 104, and 106 resolve names are also referred to as the one or more zones serviced by (or hosted by) peer DNS servers 102, 104, and 106. Additional peer DNS servers can resolve names for other DNS zones.

Peer DNS servers 102, 104, and 106 are peers of one another and operate in a multi-master DNS environment. The environment (e.g., system 100) in which peer DNS servers 102, 104, and 106 operate is referred to as a multi-master DNS environment because each of peer DNS servers 102, 104, and 106 is a primary DNS server (also referred to as a master DNS server). A primary or master DNS server can both read data from and write data to the DNS zone (e.g., read and write data used to resolve names to network addresses), as opposed to a secondary or slave DNS server that can only read data from the zone. Although three peer DNS servers 102, 104, and 106 are illustrated in system 100, it should be noted that system 100 can include any number of peer DNS servers 102, 104, and 106 for any number of zones.

The DNS implemented by peer DNS servers 102, 104, and 106 allows devices or services to be identified using a domain name (such as the host name of a web server) that is typically more easily used and referred to by users than network addresses (such as Internet Protocol (IP) v4 or v6 addresses). Peer DNS servers 102, 104, and 106 operate to map a particular name, such as a domain name, to a corresponding network address that can be used by a computing device (e.g., a computing device 112) to access a particular device or service. This mapping of a name to a corresponding network address is also referred to as DNS resolution. Although the DNS system oftentimes maps names to corresponding IP addresses, it should be noted that the DNS system can alternatively map names to other types of network addresses.

In one or more embodiments, the DNS implemented by peer DNS servers 102, 104, and 106 refers to a system in compliance with the well-known DNS protocol (e.g., as discussed in Network Working Group Request for Comments 1034 (November 1987) and in Network Working Group Request for Comments 1035 (November 1987)). However, it should be noted that the techniques discussed herein can be used in conjunction with other systems or protocols that perform similar functionality.

DNS resolver 110 is a device that submits DNS queries to a DNS server 102, 104, and/or 106. DNS resolver 110 can be implemented in a variety of different devices, such as being included as part of a computing device 112. Alternatively, DNS resolver 110 can be implemented in other devices, such as in other devices of network 110, a server or other device of an Internet Service Provider (ISP), and so forth. Although a single DNS resolver 110 is illustrated in FIG. 1, it should be noted that any number of DNS resolvers 110 can be included in system 100.

DNS resolver 110 submits a DNS query to a peer DNS server 102, 104, or 106, the DNS query being a request to resolve a particular name (e.g., a domain name included as part of a Uniform Resource Locator (URL) or other name). The peer DNS server 102, 104, and 106 that receives the DNS query resolves the particular name, and generates a DNS response that includes the network address (e.g., an IP address) to which that particular name resolves. The DNS response is returned to DNS resolver 110. The network address in the DNS response can be used by DNS resolver 110 to access a particular device or server having that network address, or provided to another computing device (e.g., a computing device 112) to access a particular device or server having that network address.

Additionally, peer DNS servers 102, 104, and 106 support security extensions or functionality allowing various information or data provided by peer DNS servers 102, 104, and 106 to be authenticated by recipients of such information or data (e.g., by a DNS resolver 110). In one or more embodiments, peer DNS servers 102, 104, and 106 support the well-known DNS Security Extensions (DNSSEC) protocol. Additional information regarding the DNSSEC protocol can be found in, for example, Network Working Group Request for Comments 4033 (March 2005), Network Working Group Request for Comments 4034 (March 2005), Network Working Group Request for Comments 4035 (March 2005), and Network Working Group Request for Comments 5155 (March 2008).

These security extensions or functionality include supporting digital signatures for DNS responses returned by peer DNS servers 102, 104, and 106 in response to DNS queries. The digital signature for a DNS response typically refers to a digital signature generated by digitally signing DNS data (the DNS data being the network address to which a name is mapped). Additional data (if any) in the DNS response (or the entire DNS response itself) that is returned by a peer DNS server 102, 104, or 106 in response to a DNS query is typically not, although alternatively can be, digitally signed. It should be noted that discussions herein regarding digitally signing the DNS data can alternatively include digitally signing additional data in the DNS response and/or digitally signing the entire DNS response. A digital signature for a DNS response can be generated by a peer DNS server 102, 104, and 106 itself (e.g., using a private key of the peer DNS server) or alternatively can be generated by another device or component (e.g., using a private key of another entity trusted by the peer DNS server) on behalf of the peer DNS server.

The DNS response that a peer DNS server 102, 104, and 106 returns to DNS resolver 110 includes a digital signature generated by that peer DNS server 102, 104, and 106 (or alternatively another trusted entity). In one or more embodiments, the key used to digitally sign the DNS response is a private key of a public/private key pair associated with the peer DNS servers 102, 104, and 106. The public key of the public/private key pair is made available to devices in system 100, allowing a recipient of the DNS response (e.g., DNS resolver 110) to verify that the DNS data is authentic.

Key store 108 maintains the private keys used by peer DNS servers 102, 104, and 106 to generate digital signatures. Key store 108 typically stores the private keys in a secure manner, such as by encrypting the private keys. Key store 108 can be implemented in a variety of different manners, such as using a hardware cryptographic module. Key store 108 can also be implemented as part of a site or server that manages directory services for system 100 (e.g., a site supporting an Active Directory® directory service, available from Microsoft Corporation of Redmond, Wash.). It should be noted that key store 108 can be implemented as a separate device (e.g., separate from computing devices 112 and peer DNS servers 102, 104, and 106), or as part of a device of system 100 (e.g., part of a peer DNS server 102, 104, and/or 106, or part of a computing device 112). Although a single key store 108 is illustrated in FIG. 1, it should be noted that any number of key stores 108 can be included in system 100.

Figure 2:
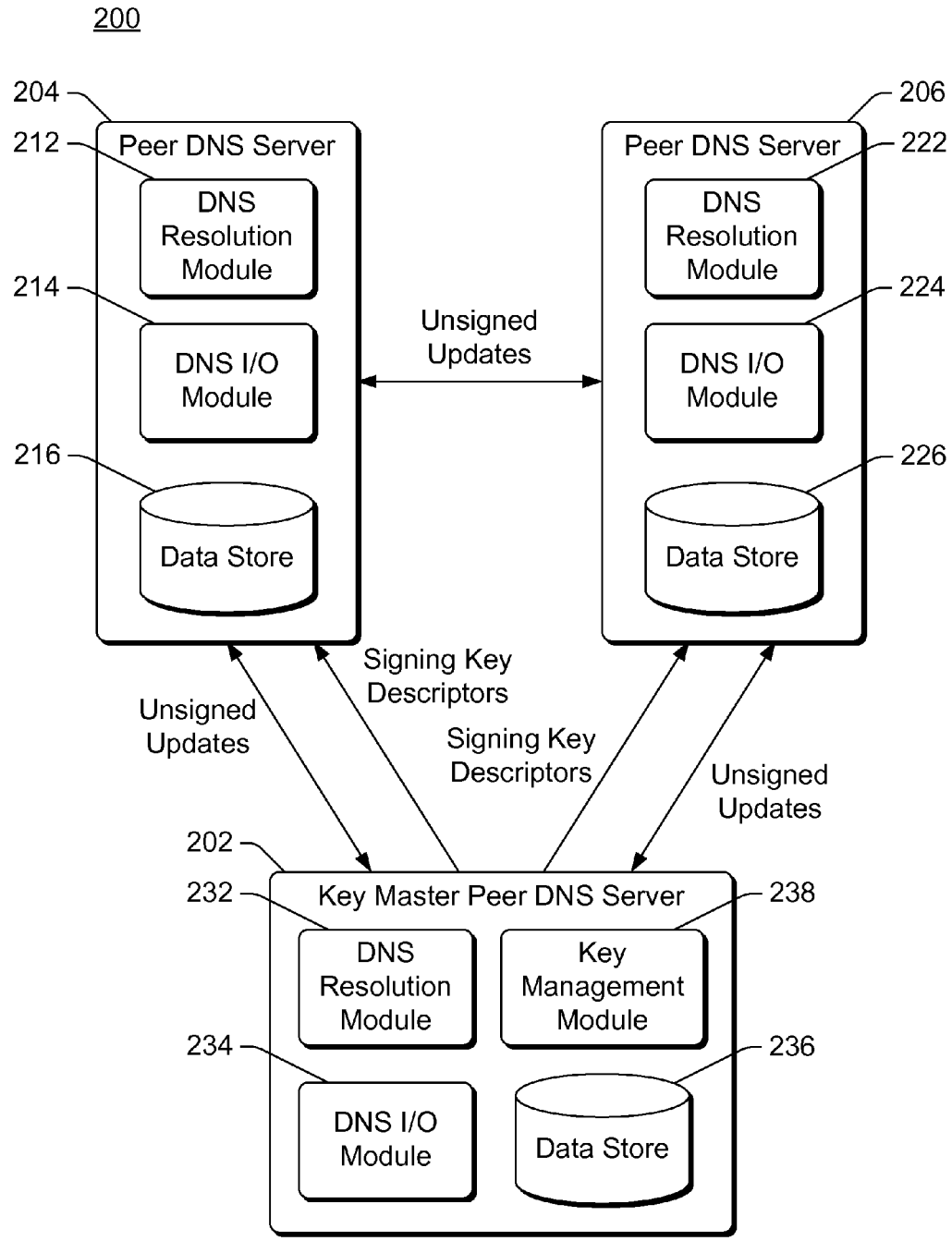
FIG. 2 illustrates an example system including multiple peer DNS servers in accordance with one or more embodiments.

FIG. 2 illustrates an example system 200 including multiple peer DNS servers in accordance with one or more embodiments. System 200 includes a peer DNS server 202, a peer DNS server 204, and a peer DNS server 206, which can be a server 102, a server 104, and a server 106, respectively, of FIG. 1. Peer DNS server 202 is a peer DNS server analogous to servers 204 and 206, and also includes additional key management functionality as discussed in more detail below. Accordingly, peer DNS server 202 can also be referred to as a key master peer DNS server.

Each peer DNS server 202, 204, and 206 includes a DNS resolution module (modules 212, 222, and 232), a DNS input/output (I/O) module (modules 214, 224, and 234), and a data store (stores 216, 226, and 236). The data store of a peer DNS server maintains mappings of names to corresponding network addresses for the DNS zone serviced by the DNS server. The DNS I/O module of a peer DNS server receives DNS queries from, and returns DNS responses to, a DNS resolver. The DNS resolution module of a peer DNS server resolves names in the DNS queries based on the mappings in the data store of that peer DNS server, and provides the network address to which a name is resolved to the DNS I/O module for generation and return of the DNS response resolving the name in the DNS query. The DNS resolution module can also include remote query functionality, querying other DNS servers to resolve a DNS query if the peer DNS server including that DNS resolution module is not able to resolve the DNS query itself. The DNS I/O module also receives updates to the mappings maintained in the data store of the peer DNS server from other peer DNS servers, and the DNS I/O module (or alternatively DNS resolution module) records those updates in the data store. Although illustrated as separate modules, it is to be appreciated that multiple ones of the modules in each server 202, 204, and 206 can be combined into a single module, or functionality of a particular module in each server 202, 204, and 206 can be separated into multiple different modules.

In one or more embodiments, each of the mappings of a name to a network address maintained in the data store of a peer DNS server is digitally signed by that peer DNS server (e.g., by the DNS resolution module, the DNS I/O module, or another module of that peer DNS server). Accordingly, the digital signature for DNS data is pre-generated and need not be generated in response to a received DNS query. Alternatively, the mappings of the names to network addresses maintained in the data store may not be digitally signed, and the digital signature for DNS data can be generated in response to a received DNS query.

Each peer DNS server in system 200 can receive updates to the mappings of names to network addresses for the DNS zone serviced by the peer DNS servers. These updates can include new mappings to be added, mappings to be deleted, and/or changes to current mappings. Such updates can be received from various sources, such as an administrator of the DNS zone serviced by the peer DNS servers, from a DNS resolver, from another computing device, and so forth. When an update is received, the DNS I/O module of the peer DNS server that receives the update provides the update to the other peer DNS servers in system 200. The update can be provided to the other peer DNS servers in a variety of different manners, such as using one or more data packets to send the update over the communication network, via a directory service (e.g., an Active Directory® directory service), and so forth. Thus, a single one of the peer DNS servers in system 200 can receive an update from another device and distribute that update so that it is reflected in all of the peer DNS servers in system 200. The data stores of each of the various peer DNS servers in system 200 store copies of the mappings stored by the other peer DNS servers in system 200.

When an update to a mapping of a name to a network address is received by a peer DNS server, whether the update is received from another peer DNS server or another device, the DNS data in the received update is digitally signed by the peer DNS server and stored in its data store. Each peer DNS server is responsible for digitally signing its own copy of the DNS data in the received update and storing that digitally signed copy in its data store (e.g., storing the update and a digital signature for the update in its data store). Thus, updates to the mappings of names to network addresses for the DNS zone serviced by the peer DNS servers are communicated among the peer DNS servers with each peer DNS server digitally signing the DNS data in the update when received—the peer DNS servers do not replicate signatures.

In one or more embodiments, the data stores of the peer DNS servers are implemented in volatile media (such as random access memory (RAM)). In alternate embodiments, the data stores of the peer DNS servers are implemented at least in part in nonvolatile media (e.g., Flash memory, disk, etc.).

One of the peer DNS servers in system 200 is a key master peer DNS server, which is server 202 in the example of FIG. 2. Key master peer DNS server 202 is responsible for generating a set of keys, managing the lifecycle of a set of keys (e.g., determining when a set of keys is to expire and when a new set of keys is to be generated for system 200), and distributing the set of keys to the other peer DNS servers in system 200. In one or more embodiments, these keys include the various keys used by DNS servers in implementing security extensions or functionality, such as in implementing the DNSSEC protocol. For example, the set of keys can include private keys of public/private key pairs used by the peer DNS servers to generate digital signatures for DNS data. Key master peer DNS server 202 distributes a set of keys to the other peer DNS servers in system 200, sharing the set of keys so that all peer DNS servers servicing the same DNS zone use the same set of keys. Other peer DNS servers in system 200, other than key master peer DNS server 202, are not responsible for (and typically do not perform) this generation, management, and distribution of the set of keys. However, situations can arise in which a key master peer DNS server 202 delegates the responsibility for this generation, management, and distribution of the set of keys to another peer DNS server, or another peer DNS server seizes the responsibility for this generation management, and distribution of the set of keys, in which case that other peer DNS server becomes the key master peer DNS server. Thus, which peer DNS server in system 200 is the key master peer DNS server can change over time.

Which one of the multiple peer DNS servers in system 200 is the key master peer DNS server can be determined in different manners. For example, one of the multiple peer DNS servers in system 200 can be selected to be the key master peer DNS server by an administrator of system 200. By way of another example, the multiple peer DNS servers can negotiate amongst themselves to select one to be the key master peer DNS server, such as selecting one randomly, selecting one based on a lowest or highest value for associated identifiers of the peer DNS servers, and so forth.

Key master peer DNS server 202 includes a key management module 238 that implements the key management functionality, including generating a set of keys, managing the lifecycle of a set of keys, and distributing a set of keys to the other peer DNS servers in system 200. Key management module 238 generates a new set of keys at various times and/or in response to various events. For example key management module 238 can generate a new set of keys in response to a request from the administrator of system 200, a threshold amount of time after a previous set of keys was generated or distributed (e.g., prior to expiration of the previous set of keys), and so forth. Key management module 238 can generate the new set of keys by generating the new set of keys itself, or alternatively invoking another component or module of key master peer DNS server 202 (or another computing device) from which the new set of keys are received.

In one or more embodiments, the set of keys includes one or more public/private key signing key pairs and also includes one or more public/private zone signing key pairs. Key management module 238 generates a record including the one or more public key signing keys of the one or more public/private key signing key pairs, and one or more public zone signing keys of the one or more public/private zone signing key pairs, which can be referred to as a DNS key record. Key management module 238 generates at least one digital signature for the DNS key record by digitally signing the DNS key record with at least one of the one or more private key signing keys of the one or more public/private key signing key pairs. Key management module 238 can also generate at least one digital signature for the DNS key record by digitally signing the DNS key record with at least one of the one or more private zone signing keys of the one or more public/private zone signing key pairs. The one or more private zone signing keys are also used to generate other digital signatures used in the DNS zone serviced by the peer DNS servers, such as digital signatures for DNS data. This DNS key record, and digital signature generated by digitally signing the DNS key record, can then be made available to other devices in the network (e.g., peer DNS servers, DNS resolvers, etc), providing such other devices with the public keys of the one or more public/private key signing key pairs and the one or more public/private zone signing key pairs. For example, this DNS key record and digital signature can be communicated via a directory service (e.g., an Active Directory® directory service), using one or more data packets to send the DNS key record and digital signature over the communication network, and so forth.

Key management module 238 also stores the set of keys in a key store, such as key store 108 of FIG. 1. This key store can be part of key master peer DNS server 202, or alternatively can be part of another device. Key management module 238 stores the set of keys by, for example, storing the one or more public/private key signing key pairs and the one or more public/private zone signing key pairs in the key store. Alternatively, rather than storing the key pairs, the one or more private keys of the one or more public/private key signing key pairs and/or the one or more private keys of the one or more public/private key signing pairs can be stored in the key store.

In one or more embodiments, the set of keys are stored securely in the key store so that other peer DNS servers in system 200 can retrieve the set of keys but other devices cannot. The set of keys can be stored securely in a variety of different manners, such as encrypting the set of keys using a symmetric key known to the peer DNS servers, encrypting the set of keys using a public key of a public/private key pair for which only the peer DNS servers know the private key, having the key store authenticate a device as being a peer DNS server prior to providing the set of keys to such a device, and so forth.

It should be noted that although the one or more private key signing keys of the one or more public/private key signing pairs can be stored in the key store, peer DNS servers other than key master peer DNS server 202 do not use the private key signing key. A private key signing key is used by key management module 238 to digitally sign the DNS key record, and typically is not used to generate other digital signatures, and thus peer DNS servers other than key master peer DNS server 202 do not use the one or more private key signing keys. Alternatively, the one or more private key signing keys of the one or more public/private key signing pairs can be maintained by key master peer DNS server 202 and need not be stored in the key store.

Key master peer DNS server 202 also generates a signing key descriptor. One or more modules of key master peer DNS server 202 (e.g., including key management module 238) can generate the signing key descriptor, optionally using parameters input by an administrator of system 200). In one or more embodiments, the signing key descriptor includes, as one parameter, an identifier of (e.g., an address of or other pointer to) the set of keys stored in the key store.

The signing key descriptor also includes one or more other parameters used by the peer DNS servers in system 200 when generating digital signatures and/or performing other security functionality. In general, the parameters in the signing key descriptor describe how a DNS zone is to be signed (e.g., the parameters describe the configuration and security behavior in the DNS zone). The particular parameters that are included can vary based on the manner in which security extensions are provided by the peer DNS servers in system 200. In one or more embodiments, these particular parameters are parameters defined by the DNSSEC protocol. Key management module 238 can be configured with the particular parameters to include in the signing key descriptor (e.g., parameters identified by an administrator of system 200), or can retrieve or otherwise obtain the particular parameters to include in the signing key descriptor from another device or service. Although reference is made herein to generating and using a signing key descriptor, and a signing key descriptor describing how a DNS zone is to be signed, it should be noted that the techniques discussed herein are not limited to a single signing key descriptor and that any number of signing key descriptors can be generated and used. For example, two or more signing key descriptors may be used to describe how a DNS zone is to be signed.

For example, the one or more other parameters can include an identification of one or more digital signature algorithms to use (e.g., including whether NextSecure (NSEC) or NSEC3 records are to be used), one or more algorithms to use to generate public/private key pairs, and/or the lengths of each of the private keys. By way of another example, one or more other parameters can include an indication of when the private keys expire (e.g., a number of hours or days, a specific date and/or time, etc.), or when the set of keys is to be used in place of a previous set of keys (e.g., a number of minutes or hours after the signing key descriptor is generated, a specific date and/or time, etc.).

Key management module 238 provides (e.g., via DNS I/O module 234) the signing key descriptor to the other peer DNS servers in system 200 (e.g., peer DNS server 204 and peer DNS server 206). The DNS I/O modules of the other peer DNS servers in system 200 (e.g., peer DNS server 204 and peer DNS server 206) receive the signing key descriptor from key management module 238. The signing key descriptor can be provided to the other peer DNS servers in system 200 in a variety of different manners. For example, the signing key descriptor can be communicated via a directory service (e.g., an Active Directory® directory service), using one or more data packets to send the signing key descriptor over the communication network, and so forth.

The other peer DNS servers in system 200 retrieve the set of keys (e.g., the DNS key record) identified in the signing key descriptor from the key store. The retrieved set of keys can be verified or authenticated by these other peer DNS servers in a variety of different manners based on the manner in which the set of keys are securely stored in the key store. If an attempt to verify or authenticate the retrieved set of keys by one of or more of these other peer DNS servers is unsuccessful (the set of keys cannot be verified or authenticated), then those one or more other peer DNS servers do not use (and can delete or otherwise ignore) the retrieved set of keys.

Upon retrieval of a set of keys identified in the signing key descriptor from the key store by all of the other peer DNS servers, all of the peer DNS servers in system 200 have the same set of keys and other parameters when generating digital signatures and/or performing other security functionality. The various peer DNS servers in system 200 can then proceed to use the retrieved set of keys as appropriate in accordance with the other parameters included in the signing key descriptor. For example, each of the various peer DNS servers in system 200 can use the set of keys to generate digital signatures for DNS data.

Alternatively, rather than including in the signing key descriptor identifiers of the set of keys stored in the key store, the various peer DNS servers in system 200 can identify the location of the set of keys in the key store in other manners. For example, the set of keys may be stored at one or more locations that are known to (e.g., configured in or otherwise provided to) the various peer DNS servers in system 200.

In one or more embodiments, key management module 238 also performs a variety of additional functionality to support security extensions in the DNS zone. For example, key master peer DNS server 202 can un-sign a DNS zone serviced by peer DNS servers 202, 204, and 206, but other peer DNS servers (servers 204 and 206) cannot un-sign a DNS zone. Un-signing a DNS zone refers to removing the security extensions being used (e.g., reverting from a DNSSEC system to a system using DNS without DNSSEC). Key management module 238 can determine to un-sign a DNS zone in different manners, such as based on an input from an administrator of system 200 or an indication received from another device or server. Key management module 238 can provide an indication to un-sign the zone to the other peer DNS servers in system 200 in a variety of different manners, analogous to providing signing key descriptors to the other peer DNS servers in system 200.

By way of another example, a particular DNS zone oftentimes has a child DNS zone, which is a DNS zone to which the particular DNS zone has delegated responsibility for managing part of its zone. In certain situations, such as when using the DNSSEC protocol, an additional digitally signed record pointing from the particular DNS zone to the child zone is maintained by DNS servers (e.g., peer DNS servers) in the particular DNS zone as well as DNS servers (e.g., peer DNS servers) in the child zone. This digitally signed record is to be kept synchronized between the DNS servers in the particular DNS zone and the DNS servers in the child zone. Key management module 238 issues queries to one or more DNS servers in the child zone at regular and/or irregular intervals providing and/or requesting this digitally signed record so that the digitally signed record can be kept synchronized.

Additionally, it should be noted that the supporting DNS security in a multi-master environment techniques discussed herein facilitate compliance with the DNSSEC protocol and use of NSEC and/or NSEC3 records. Each peer DNS server can receive updates and communicate those updates to the other peer DNS servers as discussed above. Thus, at any given instance each peer DNS server may have a slightly different copy of the zone due to updates having been received by one or more peer DNS servers but not yet communicated to the other DNS servers. Each peer DNS server in system 200, however, can create its own chain of NSEC and/or NSEC3 records. Accordingly, situations in which replication of NSEC and/or NSEC3 records that may be incorrect for the peer DNS server to which the records are replicated can be avoided.

Figure 3:
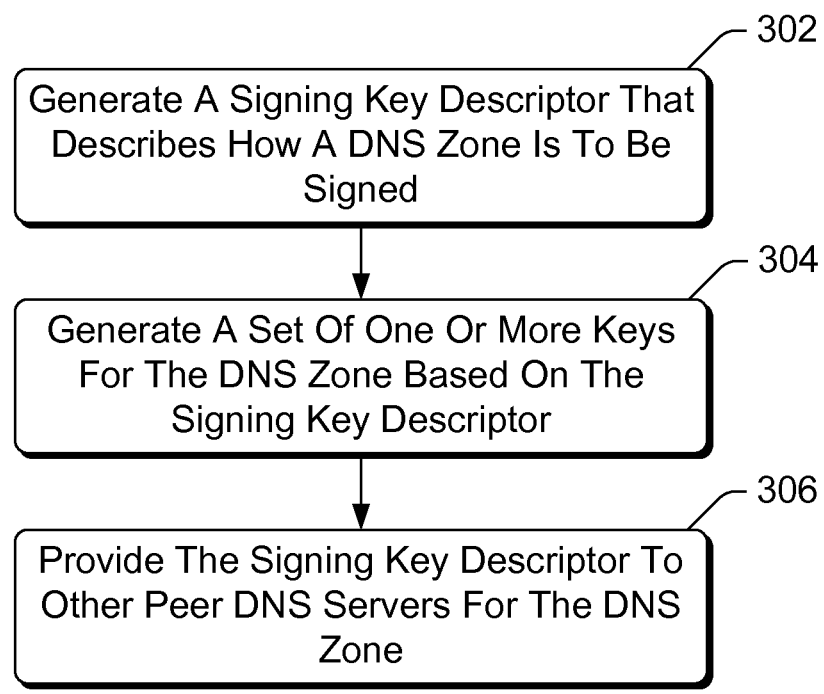
FIG. 3 is a flowchart illustrating an example process for supporting DNS security in a multi-master environment in accordance with one or more embodiments.

FIG. 3 is a flowchart illustrating an example process 300 for supporting DNS security in a multi-master environment in accordance with one or more embodiments. Process 300 is carried out by one or more modules of a key master peer DNS server, such as key master peer DNS server 102 of FIG. 1 or key master peer DNS server 202 of FIG. 2, and can be implemented in software, firmware, hardware, or combinations thereof. Process 300 is shown as a set of acts and is not limited to the order shown for performing the operations of the various acts. Process 300 is an example process for supporting DNS security in a multi-master environment; additional discussions of supporting DNS security in a multi-master environment are included herein with reference to different figures.

In process 300, a signing key descriptor that describes how a DNS zone is to be signed is generated (act 302). The signing key descriptor can describe how the DNS zone is to be signed by including various parameters that describe the configuration and security behavior in the DNS zone as discussed above.

A set of one or more keys for the DNS zone is generated based at least in part on the signing key descriptor (act 304). This DNS zone is the DNS zone serviced by the key master peer DNS server implementing process 300. The signing key descriptor includes various parameters that describe how the set of one or more keys are to be generated (e.g., one or more algorithms to use to generate the keys, lengths of the keys, etc.) as discussed above. The set of one or more keys can be generated at various times and/or in response to various events as discussed above. Additionally, the set of keys can be stored in a key store and an identifier of the set of keys in the key store included in the signing key descriptor as discussed above.

The signing key descriptor is provided to other peer DNS servers for the DNS zone (act 306). This providing of the signing key descriptor can be performed in a variety of different manners, as discussed above.

Figure 4:
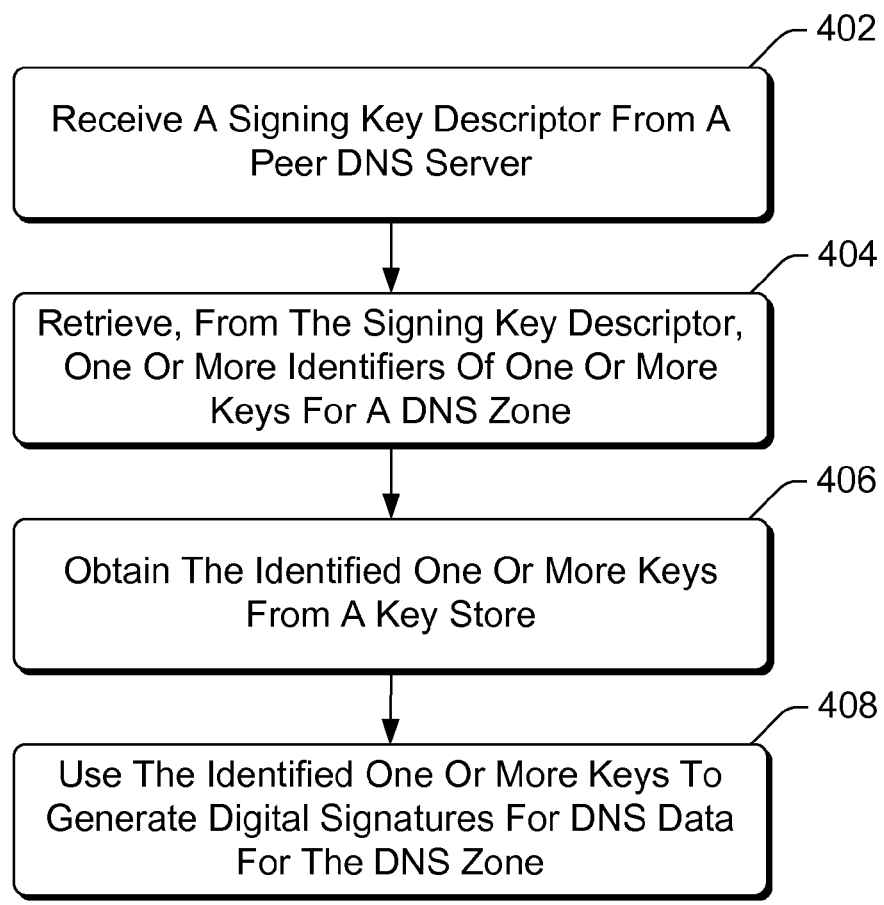
FIG. 4 is a flowchart illustrating an example process for supporting DNS security in a multi-master environment in accordance with one or more embodiments.

FIG. 4 is a flowchart illustrating an example process 400 for supporting DNS security in a multi-master environment in accordance with one or more embodiments. Process 400 is carried out by one or more modules of a peer DNS server, such as peer DNS server 104 or 106 of FIG. 1 or peer DNS server 204 or 206 of FIG. 2, and can be implemented in software, firmware, hardware, or combinations thereof. Process 400 is shown as a set of acts and is not limited to the order shown for performing the operations of the various acts. Process 400 is an example process for supporting DNS security in a multi-master environment; additional discussions of supporting DNS security in a multi-master environment are included herein with reference to different figures.

The one or more modules implementing process 400 receive a signing key descriptor from a peer DNS server (act 402). The signing key descriptor is received from a key master peer DNS server as discussed above.

One or more identifiers of one or more keys for a DNS zone are retrieved from the signing key descriptor (act 404). These one or more identifiers can each be, for example, a pointer to a public/private key pair in a key store as discussed above. Alternatively, the signing key descriptor may not include identifiers of the one or more keys; rather, the location of the one or more keys may be identified in other manners as discussed above.

The identified one or more keys are obtained from the key store (406). The one or more keys can be obtained, for example, by retrieving the pointed-to public/private key pairs from the key store.

The identified one more keys obtained from the key store are used to generate digital signatures for DNS data for the DNS zone (act 408). These identified one or more keys can be used to generate the digital signatures in a variety of different manners in accordance with security extensions for the DNS zone.

Various actions such as communicating, receiving, sending, storing, generating, obtaining, and so forth performed by various modules are discussed herein. It should be noted that the various modules can cause such actions to be performed. A particular module causing an action to be performed includes that particular module itself performing the action, or alternatively that particular module invoking or otherwise accessing another component or module that performs the action (or performs the action in conjunction with that particular module).

Figure 5:
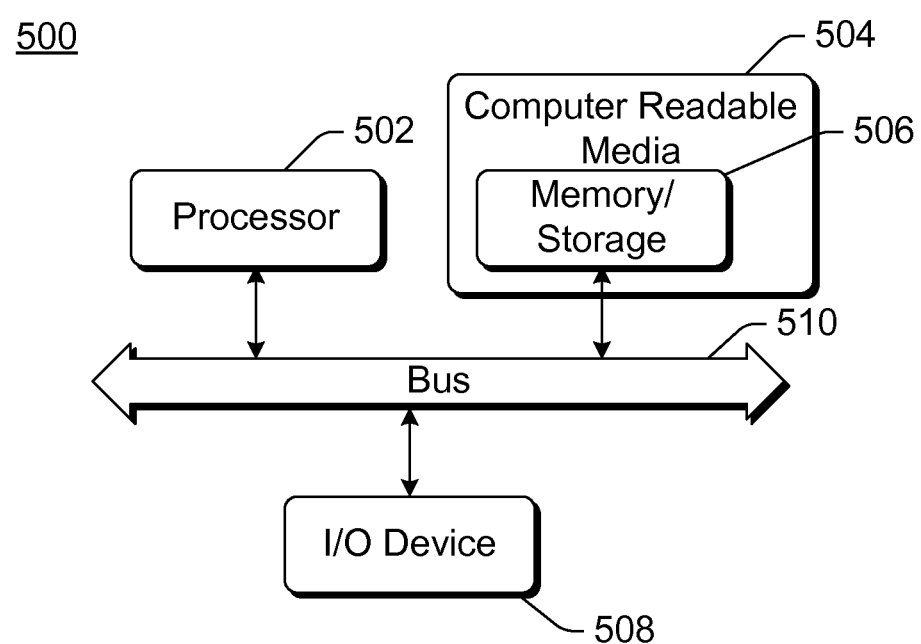
FIG. 5 illustrates an example computing device that can be configured to implement the supporting DNS security in a multi-master environment in accordance with one or more embodiments.

FIG. 5 illustrates an example computing device 500 that can be configured to implement the supporting DNS security in a multi-master environment in accordance with one or more embodiments. Computing device 500 can be, for example, a computing device 112, a peer DNS server 104 or 106, a key master peer DNS server 102, a key store 108, or a DNS resolver of FIG. 1, or a peer DNS server 204 or 206, or key master peer DNS server 202 of FIG. 2.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or non-volatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the supporting DNS security in a multi-master environment techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
generating a signing key descriptor that identifies how a domain name system (DNS) zone is to be signed;
generating, at a first peer DNS server of a multi-master DNS environment and based at least in part on the signing key descriptor, a set of one or more keys for the DNS zone;
storing the set of one or more keys for the DNS zone in a key store; and
providing the signing key descriptor to a second peer DNS server of the multi-master DNS environment, the signing key descriptor including a pointer to the set of one or more keys in the key store, the key store being remote from the second peer DNS server.

2. A method as recited in claim 1, wherein the set of one or more keys includes one or more private keys of public/private key pairs used to generate digital signatures for DNS data for the DNS zone.

3. A method as recited in claim 2, wherein no peer DNS servers in the multi-master DNS environment, other than the first peer DNS server, generate public/private key pairs used to generate digital signatures for DNS data in the DNS zone.

4. A method as recited in claim 2, further comprising:
generating a key record that includes one or more public keys of the public/private key pairs;
generating a digital signature by digitally signing the key record; and
providing the key record and the digital signature to the second peer DNS server.

5. A method as recited in claim 1, wherein the signing key descriptor includes one or more parameters used to generate digital signatures for DNS data in the DNS zone.

6. A method as recited in claim 1, further comprising providing the signing key descriptor from the first peer DNS server to each of one or more additional DNS servers of the multi-master DNS environment.

7. A method as recited in claim 1, wherein the set of one or more keys comprises one or more keys used to support security extensions for the DNS zone.

8. A method as recited in claim 1, further comprising:
receiving an update to a mapping of a name to a corresponding network address for the DNS zone;
generating a digital signature by digitally signing DNS data in the update;
storing the updated mapping and the digital signature in a data store of the first peer DNS server; and
cause the update to the mapping to be communicated to the second peer DNS server.

9. A device comprising:
one or more processors; and
memory storing instructions which, responsive to execution by the one or more processors, cause the device to perform operations comprising:
receiving, at a first peer domain name system (DNS) server, a signing key descriptor from a second peer DNS server, the first peer DNS server and the second peer DNS server each being DNS servers for a DNS zone of a multi-master DNS environment;
causing one or more keys to be obtained from a key store remote from the first peer DNS server; and
using the one or more keys to generate, based at least in part on the signing key descriptor, digital signatures for DNS data for the DNS zone.

10. A device as recited in claim 9, the operations further comprising retrieving, from the signing key descriptor, one or more identifiers of the one or more keys maintained in the key store, and wherein causing the one or more keys to be obtained from the key store is based on the one or more identifiers.

11. A device as recited in claim 9, the operations further comprising maintaining mappings of names to corresponding network addresses for the DNS zone in a volatile memory.

12. A device as recited in claim 11 the operations further comprising:
generating a digital signature by digitally signing each mapping stored in the volatile memory using at least one of the one or more keys; and
maintaining each digitally signed mapping in the volatile memory store.

13. A device as recited in claim 11, the operations further comprising:
receiving an update to a mapping of a name to a corresponding network address for the DNS zone;
generating a digital signature by digitally signing DNS data in the update;
storing the updated mapping and the digital signature in the volatile memory; and
causing the update to the mapping to be communicated to the second peer DNS server.

14. A device as recited in claim 9, wherein the one or more keys includes one or more private keys of one or more public/private key pairs.

15. A device as recited in claim 9, wherein the first peer DNS server does not use any keys generated by the first peer DNS server to generate digital signatures for DNS data for the DNS zone.

16. A device as recited in claim 9, the operations further comprising:
retrieving, from the signing key descriptor, one or more parameters; and
using the one or more parameters to generate the digital signatures for the DNS data for the DNS zone.

17. A device as recited in claim 9, the operations further comprising:
verifying the one or more keys; and
wherein using the one or more keys includes using the one or more keys only if the one or more keys are verified.

18. A device as recited in claim 9, wherein the one or more keys comprises one or more keys used to support security extensions for the DNS zone.

19. A device comprising:
one or more processors; and
memory storing instructions which, responsive to execution by the one or more processors, cause the device to perform operations comprising:
generating, at a first peer domain name system (DNS) DNS server, a signing key descriptor that identifies how the DNS zone is to be signed;
generating, at the first peer DNS server, a set of one or more keys for the DNS zone, the first peer DNS server being a key master peer DNS server of a multi-master DNS environment; and
providing the signing key descriptor to a second peer DNS server of the multi-master DNS environment, the signing key descriptor including a pointer to a set of public/private key pairs in a key store remote from the second peer DNS server, the set of public/private key pairs including one or more private keys used by both the first peer DNS server and the second peer DNS server to generate digital signatures for DNS data in the DNS zone.

20. A device as recited in claim 9, the first peer DNS server and the second peer DNS server each being enabled to produce different digital signatures.

* * * * *